(12) United States Patent
Davis et al.

(10) Patent No.: US 6,451,486 B1
(45) Date of Patent: Sep. 17, 2002

(54) BATTERY CATHODE INCLUDING A MIXTURE OF MANGANESE DIOXIDE WITH CARBON PARTICLES OF EXPANDED AND NON-EXPANDED GRAPHITE

(75) Inventors: Stuart M. Davis, Norfolk, MA (US); Qingqi Huang, Carmel, IN (US); John S. Miller, Dedham, MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/561,708

(22) Filed: May 1, 2000

(51) Int. Cl.$^7$ .............................. H01M 4/50; H01M 4/62
(52) U.S. Cl. ................ 429/232; 429/224; 429/231.8
(58) Field of Search ................ 429/224, 232, 429/231.8

(56) References Cited

U.S. PATENT DOCUMENTS

| | | |
|---|---|---|
| 1,137,373 A | 4/1915 | Aylsworth |
| 3,024,092 A | 3/1962 | Gessler |
| 3,323,869 A | 6/1967 | Olstowski |
| 3,903,219 A | 9/1975 | Stephanoff |
| 4,079,174 A | 3/1978 | Beck et al. |
| 4,096,318 A | 6/1978 | Wurmb et al. |
| 4,176,447 A | 12/1979 | Brennan |
| 4,281,046 A | 7/1981 | Davis, Jr. |
| 4,320,184 A | 3/1982 | Bernstein et al. |
| 4,320,185 A | 3/1982 | Bernstein et al. |
| 4,350,576 A * | 9/1982 | Watanabe .................. 204/101 |
| 4,465,743 A | 8/1984 | Skarstad et al. |
| 4,499,160 A | 2/1985 | Babai et al. |
| 4,777,083 A | 10/1988 | Ono et al. |
| 4,925,747 A | 5/1990 | Kordesch et al. |
| 4,925,752 A | 5/1990 | Fauteux et al. |
| 5,069,988 A | 12/1991 | Tomantschger et al. |
| 5,162,169 A | 11/1992 | Tomantschger et al. |
| 5,186,919 A | 2/1993 | Bunnell |
| 5,246,897 A | 9/1993 | Ono et al. |
| 5,294,300 A | 3/1994 | Kusuyama |
| 5,358,802 A | 10/1994 | Mayer et al. |
| 5,426,006 A | 6/1995 | Delnick et al. |
| 5,478,672 A | 12/1995 | Mitate |

(List continued on next page.)

FOREIGN PATENT DOCUMENTS

| | | | |
|---|---|---|---|
| EP | 0 579 879 A1 | 1/1994 | |
| FR | 2199618 | * 5/1974 | ............ H01M/4/62 |
| JP | 58-189963 | 11/1983 | |
| JP | 59-78451 | 5/1984 | |
| JP | 40912939 | * 5/1997 | ............ H01M/4/62 |
| JP | 411149927 | * 6/1999 | ............ H01M/4/62 |
| WO | WO 93/08123 | 4/1993 | |
| WO | WO 99/34673 | 7/1999 | |
| WO | WO 99/46437 | 9/1999 | |

OTHER PUBLICATIONS

Kosteck et al., "Raman Spectroscopy and Electron Microscopy of Heat–Treated Petroleum Cokes for Lithium–Intercalation Electrodes", J. Electrochem. Soc., vol. 144, No. 9, pp. 3111–3117, Sep. 1997.

Spoor et al., "Generation of (Ultra) Fine Carbonaceous Particle Aerosols", J. Aerosol Sci., vol. 27, Suppl. 1, pp. 5397–5398, Sep. 1996.

Herold et al., "Exfoliation of Graphite Intercalation Compounds: Classification and Discussion of the Processes from New Experimental Data Relative to Graphite–Acid Compounds", Materials Science Forum vols. 152–153, pp. 281–288, 1994.

*Primary Examiner*—Gabrielle Brouillette
*Assistant Examiner*—Mark Ruthkosky
(74) *Attorney, Agent, or Firm*—Fish & Richardson P.C.

(57) ABSTRACT

A primary alkaline battery has a cathode including manganese dioxide, carbon particles, and binder. The carbon particles include both non-expanded graphite and expanded graphite.

16 Claims, 1 Drawing Sheet

U.S. PATENT DOCUMENTS

| | | | |
|---|---|---|---|
| 5,482,798 A | * | 1/1996 | Mototani ................... 429/224 |
| 5,698,088 A | | 12/1997 | Kang et al. |
| 5,776,372 A | | 7/1998 | Saito et al. |
| 5,846,459 A | | 12/1998 | Mercuri |
| 5,919,589 A | | 7/1999 | Kawakami et al. |
| 5,981,072 A | | 11/1999 | Mercuri et al. |
| 5,985,452 A | | 11/1999 | Mercuri |
| 6,017,633 A | | 1/2000 | Mercuri |
| 6,024,900 A | | 2/2000 | Saito et al. |
| 6,143,446 A | * | 11/2000 | Davis ........................ 429/224 |

* cited by examiner

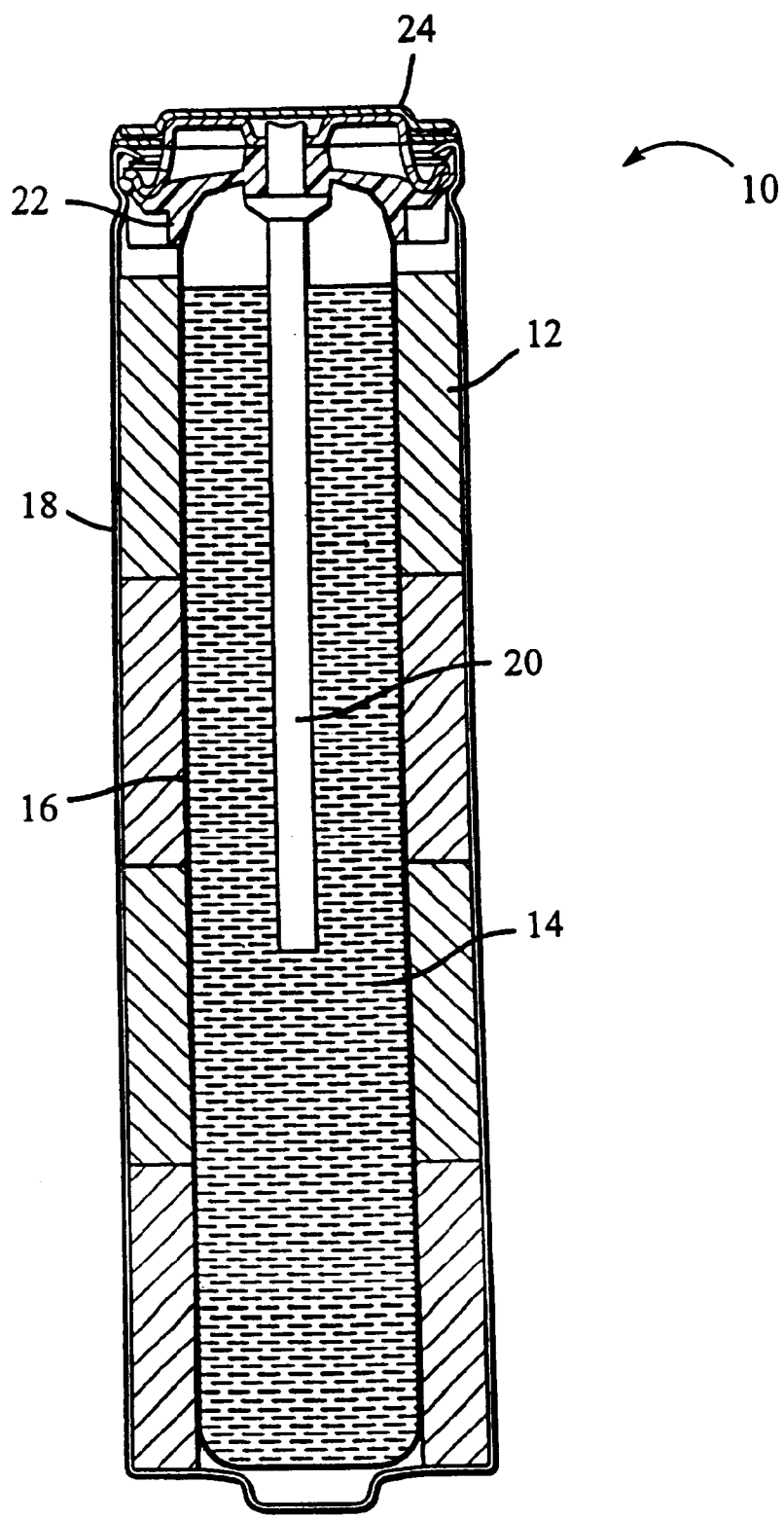

BATTERY CATHODE INCLUDING A MIXTURE OF MANGANESE DIOXIDE WITH CARBON PARTICLES OF EXPANDED AND NON-EXPANDED GRAPHITE

TECHNICAL FIELD

This invention relates to batteries.

BACKGROUND

Batteries, such as primary alkaline batteries, are commonly used as energy sources. Generally, alkaline batteries include a cathode, an anode, a separator, and an electrolytic solution. The cathode can include, for example, manganese dioxide particles as the active material, carbon particles that enhance the conductivity of the cathode, and a binder. The anode may be, for example, a gel including zinc particles as the active material. The separator is disposed between the cathode and the anode. The electrolytic solution can be, for example, a hydroxide solution that is dispersed throughout the battery.

It is desirable for a primary alkaline battery to have a high discharge capacity. One factor that affects the discharge capacity is the quantity of manganese dioxide in the cathode. As a general rule, the more manganese dioxide in the cathode, the higher the discharge capacity of the battery. But the cathode must also include a sufficient quantity of carbon particles for adequate conductivity. Thus, the quantity of manganese dioxide that can be included in the cathode is limited in part by the quantity of carbon particles required for adequate conductivity.

Typically, the carbon particles used in cathode are composed of graphite. It is known to use a specific type of graphite known as expanded graphite in place of normal graphite particles in the cathode. Expanded graphite is a flake graphite which is chemically treated and heated at a high temperature resulting in the exfoliation of the graphite particles. This produces a graphite with a significantly higher surface area thereby providing better contact with the manganese dioxide particles in the cathode. As a result, a specific quantity of expanded graphite particles provides a higher degree of conductivity to the cathode than the same quantity of non-expanded graphite particles. This in turn means that less graphite and more manganese dioxide can be included in the cathode, thus increasing the discharge capacity of the battery.

SUMMARY

The invention relates to using a blend of non-expanded graphite particles and expanded graphite particles in the cathode of primary alkaline batteries. The blend provides the cathode with enhanced conductivity in comparison to a cathode including only non-expanded graphite particles (in the same total quantity), but also is more lubricious and thus easier to process than expanded graphite particles alone. Moreover, because expanded graphite generally is more expensive than natural graphite, the cost of the graphite used in the battery is reduced as compared with cathodes including only expanded graphite.

The blend includes, for example, between 25% and 75% expanded graphite particles by weight, with the remainder being non-expanded graphite particles. Preferably, the blend includes at least 35%, and more preferably at least 45% expanded graphite particles by weight. The expanded graphite particles can have, for example, a particle size of between 15 microns and 40 microns, preferably between 18 microns and 30 microns, and an apparent density of between 0.05 g/cc and 0.10 g/cc, preferably between 0.06 g/cc and 0.08 g/cc. The non-expanded graphite particles can have, for example, a particle size of less than 20 microns, preferably between 2 microns and 12 microns, and more preferably between 5 microns and 9 microns. For purposes of this application, particle size is measured using a Sympatec HELOS analyzer. The expanded graphite particles and non-expanded graphite particles can be natural or synthetic.

Preferably, a battery having a cathode including manganese dioxide and the blend provides at least 95%, preferably at least 97%, and more preferably at least 98%, of the performance in the one watt continuous discharge test (described subsequently), the pulsed regime (described subsequently), and the photo pulse test (described subsequently) as a battery having the same components except that non-expanded graphite has been substituted for a portion of the expanded graphite in the blend. Thus, the cathode including the blend provides substantially the same performance as the cathode including only expanded graphite in the same quantity as the blend, but at reduced cost and higher lubricity.

The cathode blend can have an electrical resistivity, for example, of less than 1 ohm/cm, and preferably less than 0.5 ohm-cm. The cathode can contain, for example, between 3% and 7%, and preferably between 5% and 6%, of the graphite blend by weight.

The invention also relates to a cathode including manganese dioxide and the blend of non-expanded graphite particles and expanded graphite particles.

Other features and advantages of the invention will be apparent from the description of the preferred embodiments thereof and from the claims.

DESCRIPTION OF DRAWING

The FIGURE is a cross-section view of a battery.

DETAILED DESCRIPTION

Referring to the FIGURE, battery 10 includes a cathode 12, an anode 14, a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C, or D battery.

Cathode 12 includes manganese dioxide, a blend including both non-expanded graphite particles and expanded graphite particles, and a binder.

Any of the conventional forms of manganese dioxide used for cathodes can be used. For example, the manganese dioxide can be EMD or CMD. A preferred manganese dioxide is described in U.S. Ser. No. 09/563,447, which has been filed on the same day as this application and is hereby incorporated by reference. Distributors of manganese dioxides include Kerr McGee, Co. (Trona D), Chem Metals, Co., Tosoh, Delta Manganese, Mitsui Chemicals and JMC. Generally the cathode may include, for example, between 80% and 90%, and preferably between 86% and 88%, of manganese dioxide by weight.

The carbon particles are a blend of non-expanded graphite particles and expanded graphite particles. The graphite can be synthetic or non-synthetic, or a blend of synthetic and non-synthetic.

The non-expanded graphite particles preferably have an average particle size of less than about 20 microns, more preferably from about 2 microns to about 12 microns, and most preferably from about 5 microns to about 9 microns. Non-synthetic, non-expanded graphite particles can be obtained from, for example, Brazilian Nacional de Grafite (Itapecerica, MG Brazil (MP-0702X).

The expanded graphite particles preferably have an average particle size of less than 40 microns, more preferably between 18 microns and 30 microns, and most preferably between 24 microns and 28 microns. Expanded graphite particles may be purchased, for example, from Chuetsu Graphite Works, Ltd. (Chuetsu grades WH-20A and WH-20AF) of Japan.

The cathode may include for example, between 3% and 7%, preferably between 4% and 6.5% carbon particles by weight. Generally, between 25% and 75%, or 35% and 65%, or 40% and 60%, or 45% and 55% of the carbon particles are non-expanded graphite particles, with the remainder being the expanded graphite particles.

Examples of binders include polyethylene powders, polyacrylamides, Portland cement and fluorocarbon resins, such as PVDF and PTFE. An example of polyethylene binder is sold under the tradename Coathylene HA-1681 (available from Hoescht). The cathode may include, for example, between 0.1 percent to about 1 percent of binder by weight.

Cathode 12 can include other additives. Examples of these additives are disclosed, for example, in U.S. Pat. No. 5,342,712, which is hereby incorporated by reference. Cathode 12 may include, for example, from about 0.2 weight percent to about 2 weight percent $TiO_2$.

The electrolyte solution also is dispersed through cathode 12, and the weight percentages provided above and below are determined after the electrolyte solution has been dispersed.

Anode 14 can be formed of any of the standard zinc materials used in battery anodes. For example, anode 14 can be a zinc slurry that includes zinc metal particles, a gelling agent, and minor amounts of additives, such as gassing inhibitor. In addition, a portion of the electrolyte solution is dispersed throughout the anode.

The zinc particles can be any of the zinc particles conventionally used in slurry anodes. Examples of zinc particles include those described in U.S. Ser. Nos. 08/905,254, 09/115,867, and 09/156,915, which are assigned to the assignee in the present application and are hereby incorporated by reference. The anode may include, for example, between 67% and 71% of zinc particles by weight.

Examples of gelling agents include polyacrylic acids, grafted starch materials, salts of polyacrylic acids, polyacrylates, carboxymethylcellulose, sodium carboxymethylcellulose or combinations thereof. Examples of such polyacrylic acids are Carbopol 940 and 934 (available from B. F. Goodrich) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties). The anode may include, for example, from 0.1 percent to about 2 percent gelling agent by weight.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 can be formed of two layers of non-woven, non-membrane material with one layer being disposed along a surface of the other. To minimize the volume of separator 16 while providing an efficient battery, each layer of non-woven, non-membrane material an have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles.

In other embodiments, separator 16 includes a layer of cellophane combined with a layer of non-woven material. The separator also includes an additional layer of non-woven material. The cellophane layer can be adjacent cathode 12 or the anode. Preferably, the non-woven material contains from about 78 weight percent to about 82 weight percent PVA and from about 18 weight percent to about 22 weight percent rayon with a trace of surfactant. Such non-woven materials are available from PDM under the tradename PA25.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33% and 38% by weight percent potassium hydroxide, and sodium hydroxide solutions.

Housing 18 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface of wall, along the circumference of cathode 12 or both. This conductive layer can be formed, for example, of a carbonaceous material. Such materials include LB1000 (Timcal), Eccocoat 257 (W. R. Grace & Co.), Electrodag 109 (Acheson Colloids Company), Electrodag 112 (Acheson) and EB0005 (Acheson). Methods of applying the conductive layer are disclosed in, for example, Canadian Patent No. 1,263,697, which is hereby incorporated by reference.

Current collector 28 is made from a suitable metal, such as brass. Seal 30 can be made, for example, of nylon.

An example of battery 10 (AA) was prepared according to the following procedure. The cathode included about 9.758 grams of manganese dioxide (Kerr-McGee, Co.), 0.55 grams (5% by weight) of a 50:50 blend of Chuetsu WH-20A expanded graphite and National Graphite MP-0702X non-expanded graphite, about 0.40 g of 9N KOH solution, and about 0.3 weight percent of coathylene HA-1681. The anode included about 4.112 grams of zinc particles, about 0.54 grams of 38% KOH, about 50 ppm surfactant (RM 510, Rhone Poulenc) relative to zinc, about 1.85 g 9N KOH (with 2% dissolved ZnO), and about 0.6 weight percent total gelling agent (Carbopol 940 and A221). The porosity of the cathode was about 25%, and the density of the anode was about 70%. The separator can be formed of two layers of non-woven, non-membrane material with one layer being disposed along a surface of the other. To minimize the volume of separator, each layer of non-woven, non-membrane material had a basic weight of about 54 grams per square meter, a thickness of about 5.4 mils when dry and a thickness of about 10 mils when wet. The anode also included about 3.17 grams of an aqueous potassium hydroxide containing 2% dissolved ZnO (about 35.5 weight percent potassium hydroxide) solution disposed in the cathode and anode as indicated above with the remainder in the separator layer. A thin coating of EB005 (Acheson) was disposed between the outer wall of the battery and the outer periphery of the cathode.

An identical AA battery was prepared, except the cathode included 5% expanded graphite and no non-expanded graphite. Similarly, an identical AA battery was prepared except the cathode included 5% non-expanded graphite and no expanded graphite.

The AA batteries were stored at a temperature of from about 20.1° C. to about 22.1° C. for five days. The AA batteries were then tested according to the following procedure.

The AA battery including only expanded graphite in the cathode when discharged according to a 1.0 watt continuous test to 0.8V (the "one watt continuous discharge test") generates 0.96 service hour. The AA battery including the blend in the cathode generates 0.98 service hour. The AA battery including only non-expanded graphite in the cathode generates 0.91 service hour. Thus, the AA battery with the blend performed at least 7.5% battery including only the non-expanded graphite.

Each battery is visually examined for leakage or material damage and identified such that battery identification can be maintained throughout the test program. The batteries are oriented on their sides in holding trays such that the batteries are not in physical contact with each other. The holding trays are made to be resistant to heat and electrolytes. The trays are stored for 1 day at ambient conditions, after which the trays are placed in a preheated chamber. The trays are spaced so that there is at least about 5 cm (2 inches) of space between the chamber wall, and the tray above, below, or adjacent to each tray. The following 24 hour test sequence is repeated for 14 days.

TABLE 1

| Cycle Number | Time (hr) | Temperature (±2° C.) |
|---|---|---|
| 1 | 6.5 | Ramp from 28 to 25 |
| 2 | 4.5 | Ramp from 25 to 34 |
| 3 | 2.0 | Ramp from 34 to 43 |
| 4 | 1.0 | Ramp from 43 to 48 |
| 5 | 1.0 | Ramp from 48 to 55 |
| 6 | 1.0 | Ramp from 55 to 48 |
| 7 | 1.0 | Ramp from 48 to 43 |
| 8 | 3.0 | Ramp from 43 to 32 |
| 9 | 4.5 | Ramp from 32 to 28 |
|   | 24.0 (1 day) |   |

NOTE
The temperature gradient within each cycle shall be constant.

In the "pulsed regime", after the pre-conditioning, 1.0 watt 3 sec/100MW 7 sec to the 0.8V cutoff, the AA battery including only expanded graphite in the cathode generates 3.29 service hours. The AA battery including the blend in the cathode generates 3.30 service hours. The AA battery including only non-expanded graphite in the cathode generates 3.01 service hours, Thus, the AA battery with the blend performed at least 9% better than the AA only non-expanded graphite.

The AA battery including only expanded graphite in the cathode generates 645 pulses in the 1.8 ohm 15 s/m IEC photo test (the "photo test", which includes the pre-conditioning). The AA battery including expanded graphite in the cathode generates 652 pulses. The AA battery including only non-expanded graphite in the cathode generates 631 pulses. Thus, the AA battery with the blend performed at least 3.3% better than the AA battery including only non-expanded graphite.

A further example of an AA cell was prepared according to the following procedure.

The cathode included about 9.779 grams of manganese dioxide (Kerr-McGee, Co.), having a power coefficient greater than 3.6% as discussed in U.S. Ser. No. 09/563,447, which has already been incorporated by reference, 0.64 grams of 38% KOH, 0.59 grams of the blended expanded graphite and non-expanded graphite used in the previous example, and about 0.3 weight percent of coathylene HA-1681. The anode included about 4.213 grams of zinc particles including 1.475 grams of Noranda P-25 zinc fines, about 50 ppm surfactant (RM 510, Rhone Poulenc) relative to zinc, and about 0.5 weight percent total gelling agent (Carbopol 940 and A221). The porosity of the cathode was about 25%, and the porosity of the anode was about 70%. The separator was an outer layer of cellophane (purchased from UCB, Grade No. 300 P00.2 with a layer of non-woven material. The separator also includes an additional layer of non-woven material. The cellophane layer can be adjacent to the cathode 12 or the anode. Preferably, the non-woven material contains from about 78 weight percent to about 82 weight percent PVA and from about 18 weight percent to about 22 weight percent rayon with a trace of surfactant. Such non-woven materials are available from PDM under the trade name PA25. The anode also included about 3.10 grams of an aqueous potassium hydroxide containing about 3.10 grams (about 35.5 weight percent potassium hydroxide) solution. A thin coating of EB005 (Acheson) was disposed between the outer wall of the battery and the outer periphery of the cathode.

Other embodiments are within the claims.

What is claimed is:

1. A primary alkaline battery, comprising:
    a cathode comprising manganese dioxide and carbon particles, the carbon particles including between 25% and 75% non-expanded graphite particles by weight and between 25% and 75% expanded graphite particles by weight;
    an anode;
    a separator; and
    an alkaline electrolyte.

2. The battery of claim 1, wherein the carbon particles include between 35% and 65% non-expanded graphite particles by weight and between 35% and 65% expanded graphite particles by weight.

3. The battery of claim 1, wherein the carbon particles include between 40% and 60% non-expanded graphite particles by weight and between 40% and 60% expanded graphite particles by weight.

4. The battery of claim 1, wherein the cathode has an electrical resistivity of less than 1.0 ohm-cm.

5. The battery of claim 1, wherein the cathode comprises between 80% and 90% manganese dioxide by weight and between 2.0% and 7.0% carbon particle by weight.

6. The battery of claim 5, wherein the cathode comprises between 4.0% and 6.5% carbon particle by weight.

7. The battery of claim 1, wherein the anode comprises zinc as the active material.

8. The battery of claim 1, wherein the non-expanded graphite particles have an average particle size of less than 20 microns.

9. The battery of claim 8, wherein the expanded graphite particles have an average particle size of between 15 microns and 40 microns.

10. The battery of claim 1, wherein the expanded graphite particles have an average particle size of between 18 microns and 30 microns.

11. The battery of claim 9, wherein the expanded graphite particles have an apparent density of between 0.05 g/cc and 0.1 g/cc.

12. The battery of claim 1, wherein the expanded graphite particles have an apparent density of between 0.05 g/cc and 0.1 g/cc.

13. The battery of claim 1, wherein the battery performs at least 95% as well in the one watt continuous discharge test as a battery in which the non-expanded graphite particles in the cathode have been replaced with expanded graphite particles.

14. The battery of claim 1, wherein the battery performs at least 95% as well as in the pulsed regime as a battery in which the non-expanded graphite particles in the cathode have been replaced with expanded graphite particles.

15. The battery of claim 1, wherein the battery performs at least 95% as well as in the photo pulse test as a battery in which the non-expanded graphite particles in the cathode have been replaced with expanded graphite particles.

16. A cathode for a battery, comprising manganese dioxide and carbon particles, the carbon particles including between 25% and 75% non-expanded graphite by weight and between 25% and 75% expanded graphite by weight.

* * * * *